(12) United States Patent
Boyd et al.

(10) Patent No.: US 7,580,959 B2
(45) Date of Patent: Aug. 25, 2009

(54) APPARATUS, SYSTEM, AND METHOD FOR PROVIDING EFFICIENT DISASTER RECOVERY STORAGE OF DATA USING DIFFERENCING

(75) Inventors: Kenneth Wayne Boyd, Tucson, AZ (US); Kenneth Fairclough Day, III, Tucson, AZ (US); Phillip Matthew Doatmas, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 10/867,058

(22) Filed: Jun. 14, 2004

(65) Prior Publication Data

US 2005/0278360 A1    Dec. 15, 2005

(51) Int. Cl.
G06F 17/30 (2006.01)
G06F 7/00 (2006.01)
G06F 12/00 (2006.01)

(52) U.S. Cl. ................ 707/203; 707/101; 707/204
(58) Field of Classification Search ................ 707/100, 707/200, 202–206, 101
See application file for complete search history.

(56) References Cited

U.S. PATENT DOCUMENTS

| 5,574,906 | A | 11/1996 | Morris | 395/601 |
|---|---|---|---|---|
| 5,649,196 | A | 7/1997 | Woodhill et al. | 395/620 |
| 6,014,676 | A | 1/2000 | McClain | 707/204 |
| 6,101,507 | A | 8/2000 | Cane et al. | 707/204 |
| 6,327,671 | B1 | 12/2001 | Menon | 701/6 |
| 6,356,961 | B1 * | 3/2002 | Oprescu-Surcobe | 710/20 |
| 6,490,596 | B1 | 12/2002 | Micka | 707/203 |
| 6,633,905 | B1 * | 10/2003 | Anderson et al. | 709/219 |
| 7,117,323 | B1 * | 10/2006 | Delaney | 711/162 |
| 2003/0212712 | A1 * | 11/2003 | Gu et al. | 707/200 |
| 2004/0054700 | A1 * | 3/2004 | Okada | 707/204 |
| 2004/0098420 | A1 * | 5/2004 | Peng | 707/203 |
| 2004/0186970 | A1 * | 9/2004 | Kekre et al. | 711/162 |
| 2004/0260734 | A1 * | 12/2004 | Ren et al. | 707/203 |
| 2005/0010576 | A1 * | 1/2005 | Ren et al. | 707/100 |
| 2005/0010870 | A1 * | 1/2005 | Gu et al. | 715/540 |
| 2005/0071386 | A1 * | 3/2005 | Wolfgang et al. | 707/201 |

* cited by examiner

*Primary Examiner*—Kuen S Lu
(74) *Attorney, Agent, or Firm*—Kunzler & McKenzie

(57) ABSTRACT

An apparatus, system, and method are disclosed for efficient creation of point-in-time versions of data using differencing in a read-before-write environment. Included in an embodiment of the invention are a receive module that receives a data block sent from a primary data storage system, a read module that reads a data block from a secondary data storage device into random access memory, the data block corresponding to the data block sent from the primary data storage system, a comparison module that compares the data block sent from the primary data storage system to the data block from the secondary data storage device and creates a differencing data file, a compression module that compresses the differencing data file and to create a compressed differencing data file, and a differencing storage module stores the compressed differencing data file in a differencing storage device.

22 Claims, 8 Drawing Sheets

APPARATUS, SYSTEM, AND METHOD FOR PROVIDING EFFICIENT DISASTER RECOVERY STORAGE OF DATA USING DIFFERENCING

BACKGROUND OF THE INVENTION

1. Field of the Invention

This invention relates to remote replication data disaster recovery systems and more particularly relates to differencing and data compression in a read-before-write environment of a secondary storage to provide an efficient means for point-in-time disaster recovery of data.

2. Description of the Related Art

As financial, scientific, medical, and other critical data are being integrated with computers and computer networks, reliability and availability of the data is increasing in importance. Loss of data may have severe negative consequences for users of a computer system.

On-site backup systems are designed to reduce the possibility of data loss. Nevertheless, even with such systems in place, natural disasters such as fire, lightning, hurricanes, etc., and man made disasters such as civil unrest, computer hacker attacks, and terrorist attacks can also affect computer networks and on-site backup systems. Consequently, to preserve critical data backup systems are often located remotely. Distances from a few miles to thousands of miles are often required to overcome many disaster scenarios.

One type of data disaster recovery system maintains a mirror image of data on a primary data storage system at a remote site on a secondary data storage system. As files on a server are modified or added and then backed up on a primary data storage system, the changed blocks of data are identified and sent at particular time intervals to a secondary data storage system. The one or more data blocks that are identified as having been modified and that are sent together at the end of a time interval are referred to as a "color."

At the secondary data storage system, once a color is received, the data blocks from the color are read into random access memory (RAM). In a read-before-write system, the corresponding data blocks in a secondary data storage device are read into RAM. Once the consistency and correctness of the data blocks from the color are verified, the data blocks are sent to the secondary data storage device and are inserted in place of the corresponding data blocks in the secondary data storage device. The data blocks in the color may be processed individually or multiple data blocks may be processed together. Once the data blocks from the color have been successfully processed, the older versions of the data blocks read into RAM are discarded.

In such a remote replication system in a read-before-write environment, maintaining older data is desirable because it allows a user to recover data to a particular point in time. Maintaining full copies of an entire data structure on a secondary data storage device is problematic due to the vast amount of data storage required. Other methods of providing point-in-time versions of the data involve saving the changed blocks or files, but are still problematic due to the amount of data storage required, and the need for metadata to keep track of the changes and timing of the changes to maintain consistency.

From the foregoing discussion, it should be apparent that a need exists for an apparatus, system, and method for providing an efficient creation of point-in-time versions of data in a read-before-write environment. Beneficially, such an apparatus, system, and method would maintain a current version of the data on the primary data storage system together with previously modified data in a compact format that would readily allow disaster recovery of data at a particular point in time.

SUMMARY OF THE INVENTION

The present invention has been developed in response to the present state of the art, and in particular, in response to the problems and needs in the art that have not yet been fully solved by currently available methods of point-in-time disaster recovery of data in a remote replication system in a read-before-write environment. Accordingly, the present invention has been developed to provide an apparatus, system, and method for using differencing to efficiently create point-in-time recovery files that overcome many or all of the above-discussed shortcomings in the art.

The apparatus for efficient creation of point-in-time versions of data using differencing in a read-before-write environment is provided with a logic unit containing a plurality of modules configured to functionally execute the necessary steps of comparing new and existing versions of a data block, compressing the resultant differencing file, and storing the compressed differencing file. These modules in the described embodiments include a receive module that receives a data block sent from a primary data storage system, a read module that reads a data block from a secondary data storage device into random access memory, the data block corresponding to the data block sent from the primary data storage system, a comparison module that compares the data block sent from the primary data storage system with the data block from the secondary data storage device and creates a differencing data file, a compression module that compresses the differencing data file and creates a compressed differencing data file, and a differencing storage module that stores the compressed differencing data file in a differencing storage device.

In one embodiment, the comparison module further compares the data block sent from the primary data storage system with the corresponding data block from the secondary data storage device using an exclusive OR operation. In an alternate embodiment, the compressed differencing data file resides on the differencing storage device together with other compressed differencing files from previous differencing operations. The apparatus is further configured, in one embodiment, to include a block storage module configured to store the data block sent from the primary data storage system in the location of the data block from the secondary data storage device and to delete from the random access memory the data block from the secondary data storage device.

In one embodiment, the receive module, the read module, the comparison module, the compression module, block storage module and the differencing storage module are located in the primary data storage system. In another embodiment, they are included in the secondary data storage system. In yet another embodiment, the receive module may receive a color which is one or more data blocks sent together from the primary data storage system and the read module, the comparison module, the compression module, and the differencing module process each data block in the color separately.

The apparatus, in one embodiment, is configured to include a data restore module configured to restore data in the secondary data storage device to a particular point in time by retrieving a most recent compressed differencing data file from the differencing storage device, creating a differencing data file by uncompressing the compressed differencing data file, comparing the differencing data file to the corresponding data block from the secondary data storage device to create a resulting data block that matches the point in time associated with the compressed differencing data file, storing the resulting data block over the data block from the secondary data storage device, and repeating the above steps for successive compressed differencing data files until the point in time is reached for which the restore was sought.

A system of the present invention is also presented for efficient creation of point-in-time versions of data using differencing in a read-before-write environment. The system may be embodied by a primary data storage system, a controller in a secondary data storage system, and a wide area network connecting the primary data storage system with the secondary data storage system. In particular, the controller in the secondary data controller system, in one embodiment, includes a receive module that receives a data block sent from the primary data storage system, a read module that reads a data block from a secondary data storage device into a random access memory, the secondary data storage device being located in the secondary data storage system, the data block corresponding to the data block sent from the primary data storage system, a comparison module that compares the data block sent from the primary data storage system with the data block from the secondary data storage device and creates a differencing data file, a compression module that compresses the differencing data file and creates a compressed differencing data file, and a differencing storage module that stores the compressed differencing data file in a differencing storage device, where the differencing storage device located in the secondary data storage system.

A computer readable storage medium comprising computer readable code is configured to carry out a method for efficient creation of point-in-time versions of data using differencing in a read-before-write environment. The method in the disclosed embodiments substantially includes the steps necessary to carry out the functions presented above with respect to the operation of the described apparatus and system. In one embodiment, the method includes receiving a data block sent from a primary data storage system, reading a data block from a secondary data storage device into a random access memory, the data block corresponding to the data block sent from the primary data storage system, comparing the data block sent from the primary data storage system with the data block from the secondary data storage device and creating a differencing data file, compressing the differencing data file and to create a compressed differencing data file, and storing the compressed differencing data file in a differencing storage device.

The method also may include comparing the data block sent from the primary data storage system with the corresponding data block from the secondary data storage device further comprises using an exclusive OR operation. In a further embodiment, the method further comprises storing the data block sent from the primary data storage system in the location of the data block from the secondary data storage device and deleting from the random access memory the data block from the secondary data storage device. In yet another embodiment, the method further comprises receiving a color comprising one or more data blocks sent together from the primary data storage system and each data block in the color is processed separately.

In a further embodiment, the method includes restoring data in the secondary data storage device to a particular point in time by retrieving a most recent compressed differencing data file from the differencing storage device, creating a differencing data file by uncompressing the compressed differencing data file, comparing the differencing data file with the corresponding data block from the secondary data storage device to create a resulting data block that matches the point in time in which the differencing data file was created, storing the resulting data block over the data block from the secondary data storage device, and repeating the above steps for successive differencing data files until the point in time is reached for which the restore was sought.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
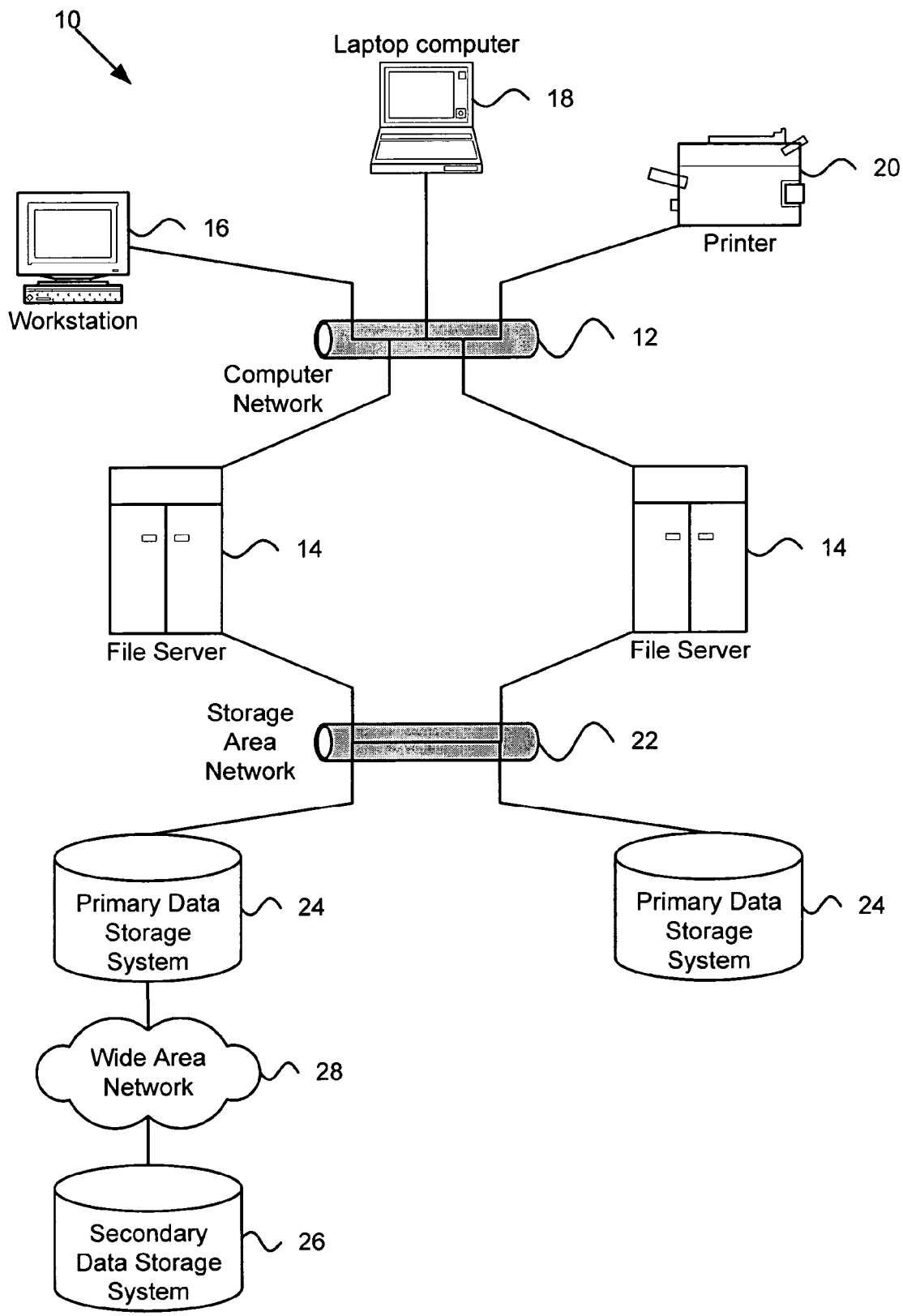
FIG. 1 is a schematic block diagram illustrating one embodiment of a system for efficient creation of point-in-time versions of data using differencing in a read-before-write environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a computer system 10 for efficient creation of point-in-time versions of data using differencing in a read-before-write environment. A computer network 12 connects one or more file servers 14, a computer workstation 16, other computers such as a laptop computer 18, a printer 20, and other computer components. The system 10 also includes a storage area network (SAN) 22 to connect one or more primary data storage systems 24 connected to the file servers 14. A primary data storage system 24 is connected to a secondary data storage system 26 through a wide area network 28. Other configurations may include other secondary storage systems 26. The wide area network 28 may comprise the internet, fiber optic cables and equipment, telephone lines, or any other appropriate connection. One skilled in the art would recognize other configurations of the wide area network 28 appropriate for connecting the primary data storage system 24 and the secondary data storage system 26. One possible system where the invention may be used is a remote replication system by Kashya Inc. in conjunction with an IBM storage solution such as the Tivoli system.

Figure 2:
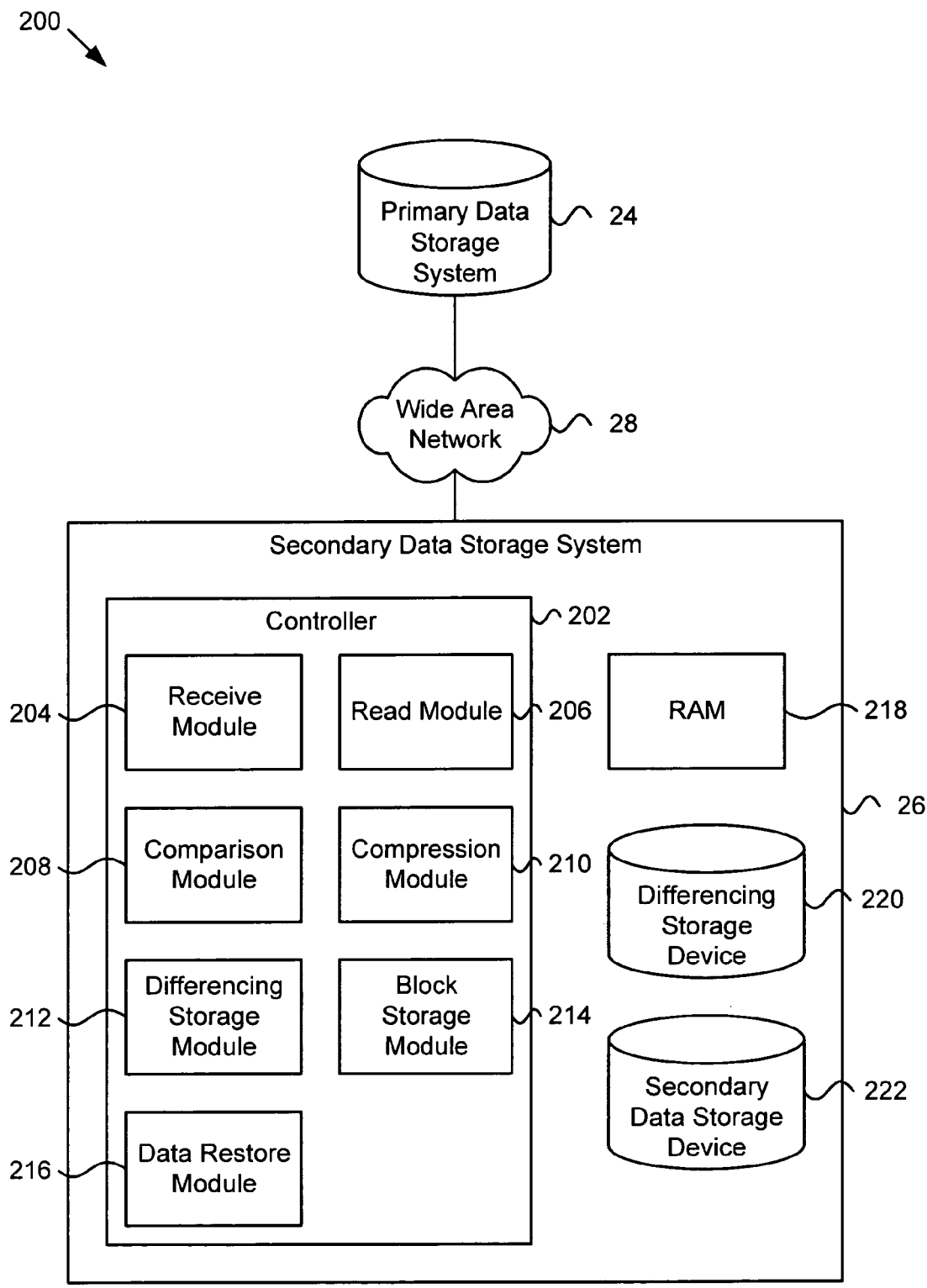
FIG. 2 is a schematic block diagram illustrating an apparatus of the present invention.

FIG. 2 is a more detailed illustration depicting one embodiment of an apparatus 200 for efficient creation of point-in-time versions of data using differencing in a read-before-write environment. The apparatus 200 may be used with the system 10 of FIG. 1 or may be employed independent thereof.

The primary data storage system 24 is connected to the secondary data storage system 26 through the wide area network 28. Typically, files are changed or added periodically within the computer system 10. In a backup environment, the files that were changed or added may be copied to the primary data storage system 24. When files are modified in the primary data storage system 24 data blocks that are affected by the file changes are noted and periodically, the changed data blocks are combined into a color and sent to the secondary data storage system 26. The time period comprising a color may be determined by the user in response to factors such as criticality of the data, network traffic, and data consistency. One skilled in the art would recognize other factors necessary to determine an appropriate time period for sending data. Whatever data blocks have been changed during the time period are included in the color sent to the secondary data storage system 26.

In one embodiment, the secondary data storage system 26 includes a controller 202. The controller 202 may include a receive module 204, a read module 206, a comparison module 208, a compression module 210, a differencing storage module 212, a block storage module 214, and a data restore module 216. In one embodiment, the secondary data storage system 26 includes random access memory (RAM) 218, a differencing storage device 220, and a secondary data storage device 222.

The data on the secondary data storage device 222 mirrors the data on the primary data storage system 24 after any changes to data on the primary data storage system 24 have been sent to the secondary data storage system 26 and overwritten older data on the secondary data storage device 222. The receive module 204 is configured to receive a data block from the primary data storage system 24 and to load it into the RAM 218. In an alternate embodiment, the receive module 204 receives a color and loads one or more data blocks of the color into the RAM 218. Consistent with a read-before-write environment, for each data block in RAM 218, the read module 206 reads into RAM 218 a corresponding data block from the secondary data storage device 222.

In accordance with the present invention, the comparison module 208 compares a data block from the primary data storage system 24 to a corresponding data block from the secondary data storage device 222 using a differencing function and creates a differencing data file. In one embodiment the differencing data function is an exclusive OR (XOR) operation. XOR differencing creates a differencing data file that is highly compressible and easily recoverable. Other differencing functions may be used. One skilled in the art will recognize other appropriate differencing functions that achieve efficient differencing of new and existing data and efficient storage of compressed differencing data files that can be recovered in accordance with the present invention.

Once the differencing data file is created, the compression module 210 compresses the differencing data file to create a compressed differencing data file. Any compression method that creates a compressed data file that can be uncompressed may be used. One skilled in the art will readily recognize a compression method appropriate for this application.

The differencing storage module 212 then stores the compressed differencing data file in the differencing storage device 220. Preferably, the compressed differencing data file is stored with other compressed differencing data files from previous operations. The compressed differencing data files are stored together with the time period associated with the data blocks from the primary data storage system 24.

Using XOR differencing in a read-before-write environment is efficient because the new data and existing data are loaded into RAM as part of a read-before-write operation. Performing an XOR operation on the data after it has already been loaded into RAM does not require significant amounts of computer resources. Compression of the highly compressible resultant data creates typically small compressed differencing data files that can be stored together until the data must be restored to a specific point in time.

In one embodiment, the block storage module 214 performs the final step of updating the data blocks on the secondary data storage device 222 by verifying the correctness and consistency of the data blocks sent from the primary data storage system 24, overwriting the corresponding data blocks in the secondary data storage device 222, and then discarding the data blocks in the RAM 218. This is characteristic of a read-before-write environment which has the advantage of verifying that the new data is correct, consistent, and safely written to the secondary data storage device 222 prior to discarding the existing data.

If data must be recovered to some point in time, the data restore module 216, in one embodiment, may be used. The data restore module 216 retrieves to the RAM 218 the most recent compressed differencing data file from the differencing storage device 220 along with the corresponding data block from the secondary data storage device 222, uncompresses the compressed differencing data file, and compares the resulting differencing data file with the corresponding data block from the secondary data storage device 222 using the same differencing function used to create the differencing data file. The resultant data block corresponds to the time period associated with the compressed differencing data file. The data restore module 216 repeats the process until the desired time period is reached to restore the data to the desired time.

Figure 3:
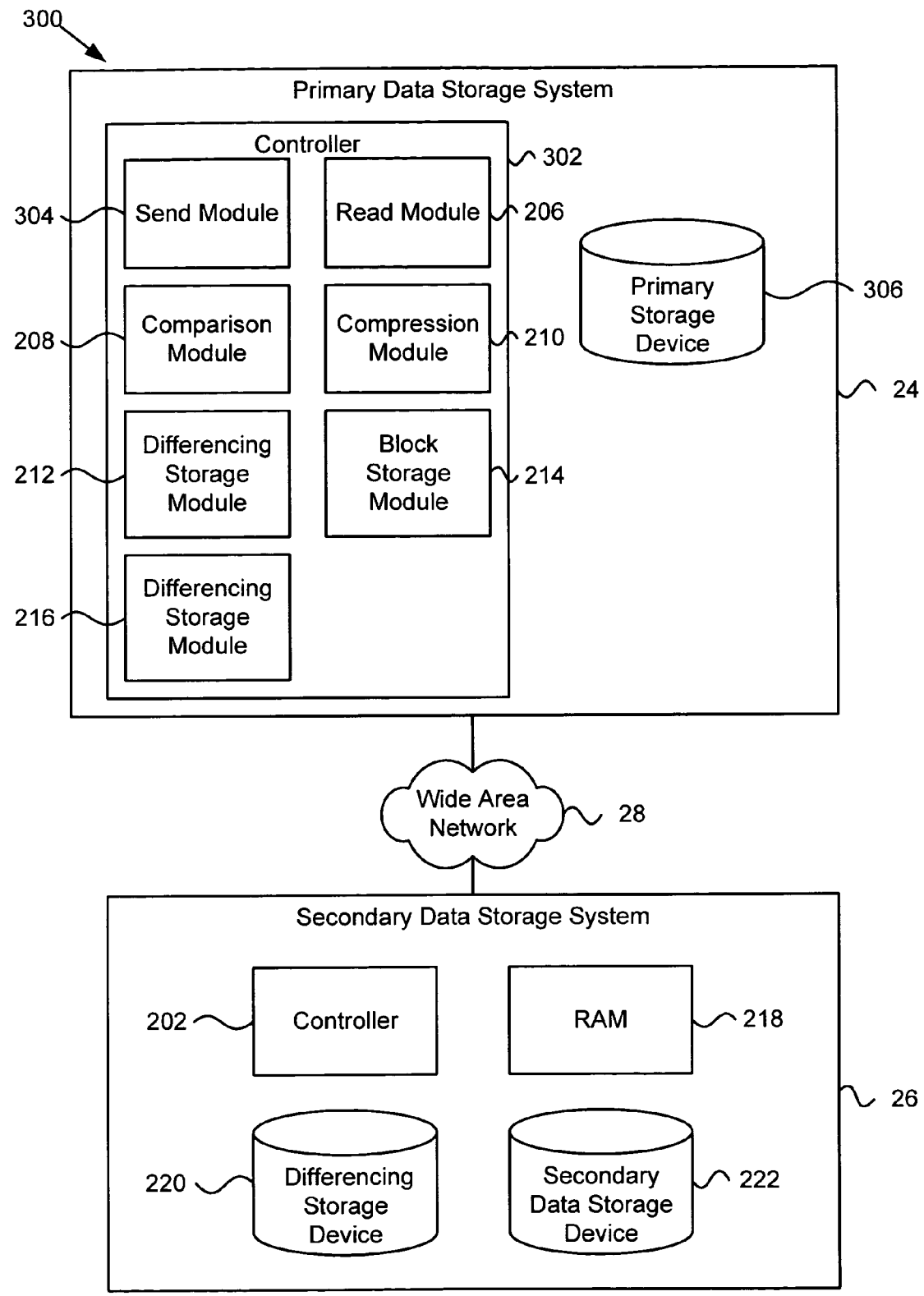
FIG. 3 is a schematic block diagram illustrating an alternate embodiment of an apparatus of the present invention.

FIG. 3 is an alternate embodiment 300 for efficient creation of point-in-time versions of data using differencing in a read-before-write environment. This embodiment is similar to the embodiment shown in FIG. 2, but the modules relevant to this invention are in a controller 302 of the primary data storage system 24. The controller 302 includes a send module 304 configured to send data blocks or, alternatively, a color from a primary data storage device 306. The read module 206, the comparison module 208, the compression module 210, the differencing storage module 212, the block storage module 214, and the data restore module 216 are located in the controller 302 in the primary data storage system 24. The wide area network 28 connects the primary data storage system 24 to the secondary data storage system 26 which includes the controller 202, the RAM 218, the differencing storage device 220, and the secondary data storage device 222. In this embodiment, the controller 302 in the primary data storage system 24 sends commands to the secondary data storage system 26. Other embodiments may have some combination where some of the modules or associated functions are located in the primary data storage system 24 and some are located in the secondary data storage system 26. One skilled in the art will recognize other configurations of the modules and functions necessary to achieve the differencing and compression for efficient data recovery in a read-before-write environment in accordance with the present invention.

Figure 4:
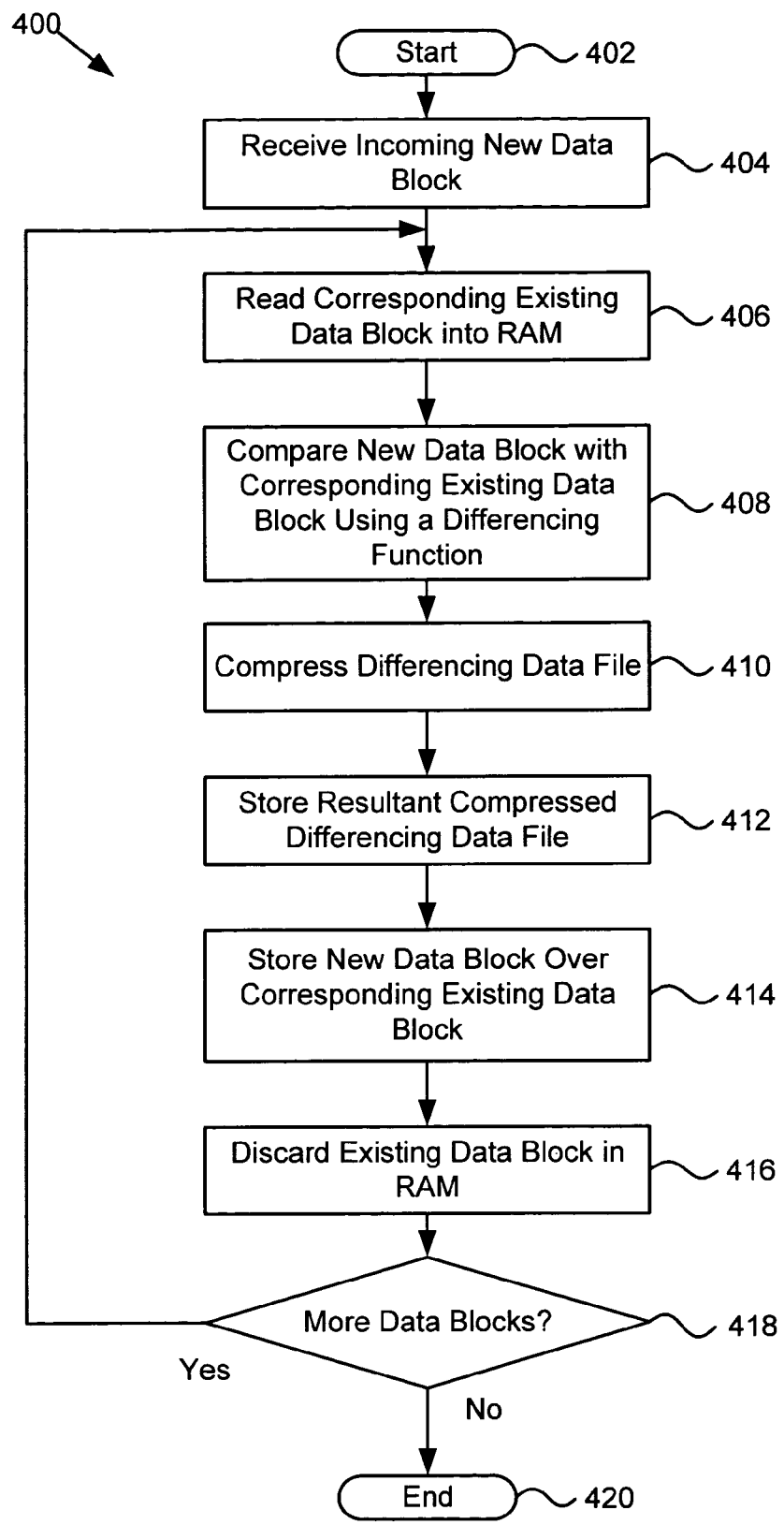
FIG. 4 is a schematic flow chart diagram illustrating one embodiment of a method for creation of point-in-time versions of data using differencing in accordance with the present invention.

FIG. 4 is a flowchart diagram for efficient creation of point-in-time versions of data using differencing in a read-before-write environment. The method 400 starts 402 when the receive module 204 receives 404 into RAM 218 an incoming new data block from the primary data storage system 24. Alternatively, the receive module 204 receives 404 into RAM 218 a color consisting of one or more data blocks. The data chosen to be sent by way of a color or data block is data that has been modified. The read module 206 then reads 406 a corresponding data block from the secondary data storage device 222 into the RAM 218. The comparison module 208 then compares 408 the new data block from the primary data storage system 24 with the corresponding data block from the secondary data storage device 222 using a differencing function to create a differencing data file. Preferably the differencing function is an XOR operation.

The compression module 210 then compresses 410 the differencing data file to produce a compressed differencing data file. The differencing storage module 212 then stores 412 the resultant compressed differencing data file in the differencing storage device 220. The differencing data storage device 220 may be a separate side file, a portion of the secondary data storage device 222, a separate hard drive, or any other appropriate data storage mechanism. One skilled in the art will recognize other appropriate storage mechanisms appropriate for storing compressed differencing data files.

The block storage module 214 then stores 414 the new data block from the primary data storage system 24 over the corresponding data block in the secondary data storage device 222 after verifying that the new data block is correct and consistent. The block storage module 214 then discards 416 the data blocks in the RAM 218 that have been compared after verifying that the new data block was successfully written over the corresponding existing data block in the secondary data storage device 222. The controller in the secondary data storage system 202 then determines 418 if there are more blocks from the primary data storage system 24 that have not been processed. If so, then the method 400 returns and the read module 206 then reads 406 into the RAM 218 the data block from the secondary data storage device 222 that corresponds with the next new data block from the primary data storage system 24. If not, then the method 400 ends 420.

Figure 5:
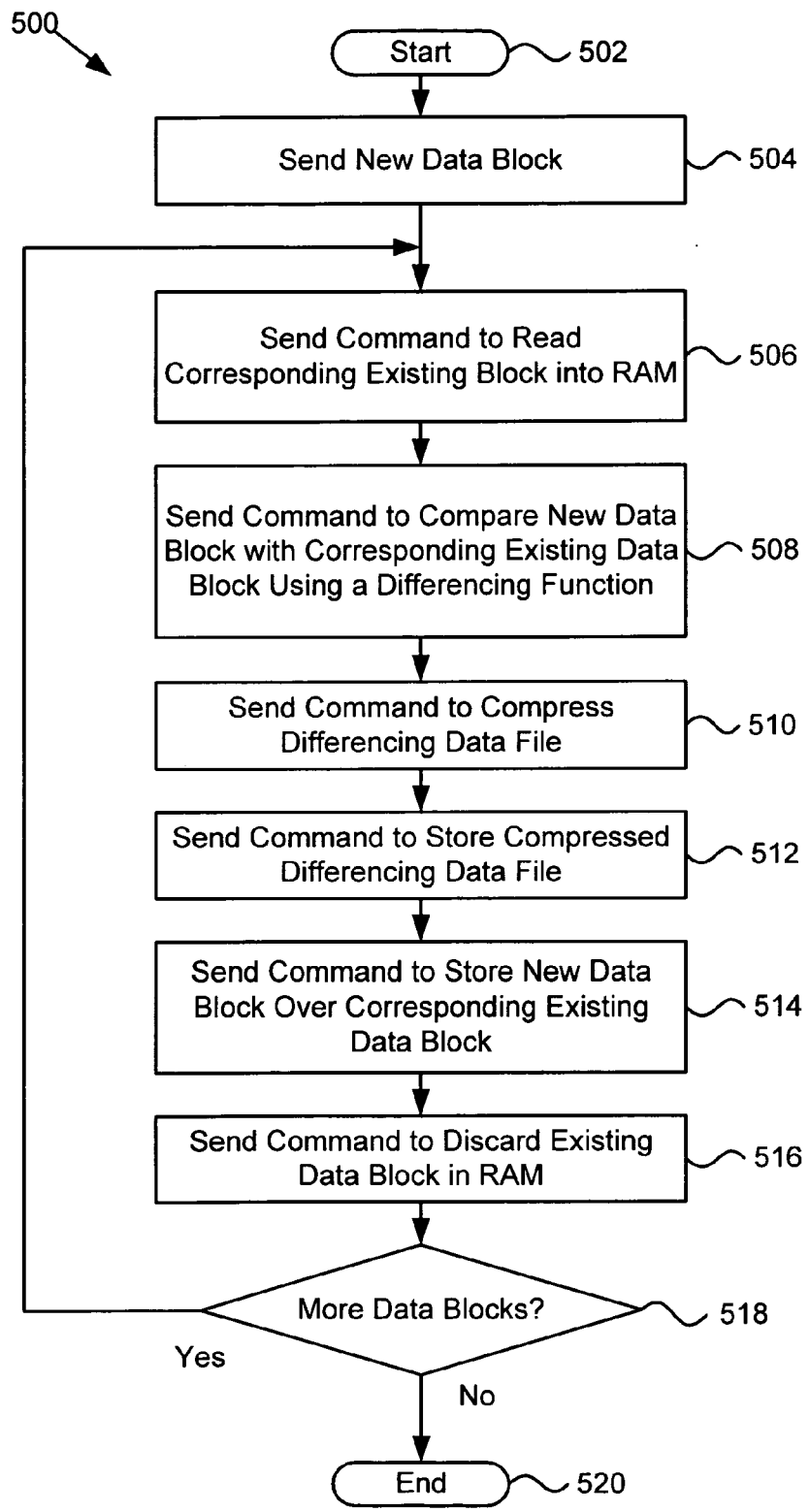
FIG. 5 is a schematic flow chart diagram illustrating an alternate embodiment of a method for creation of point-in-time versions of data using differencing in accordance with the present invention.

FIG. 5 is a schematic flow chart diagram 500 illustrating an alternate embodiment of an efficient method for creation of point-in-time versions of data using differencing in accordance with the present invention. This flow chart diagram 500 corresponds to the schematic diagram 300 shown in FIG. 3. The method 500 starts 502 when the send module 304 sends 504 a new data block from the primary data storage device 306 into RAM 218 of the secondary data storage system 26. Alternatively, the send module 304 sends 504 a color consisting of one or more data blocks into the RAM 218 of the secondary data storage system 26. Again, the data chosen to be sent by way of a color or data block is preferably data that has been modified. The remaining steps 506, 508, 510, 512,

514, 516, 518, and 520 are identical to FIG. 4 except that the commands originate in the controller 302 in the primary data storage system 24.

Figure 6:
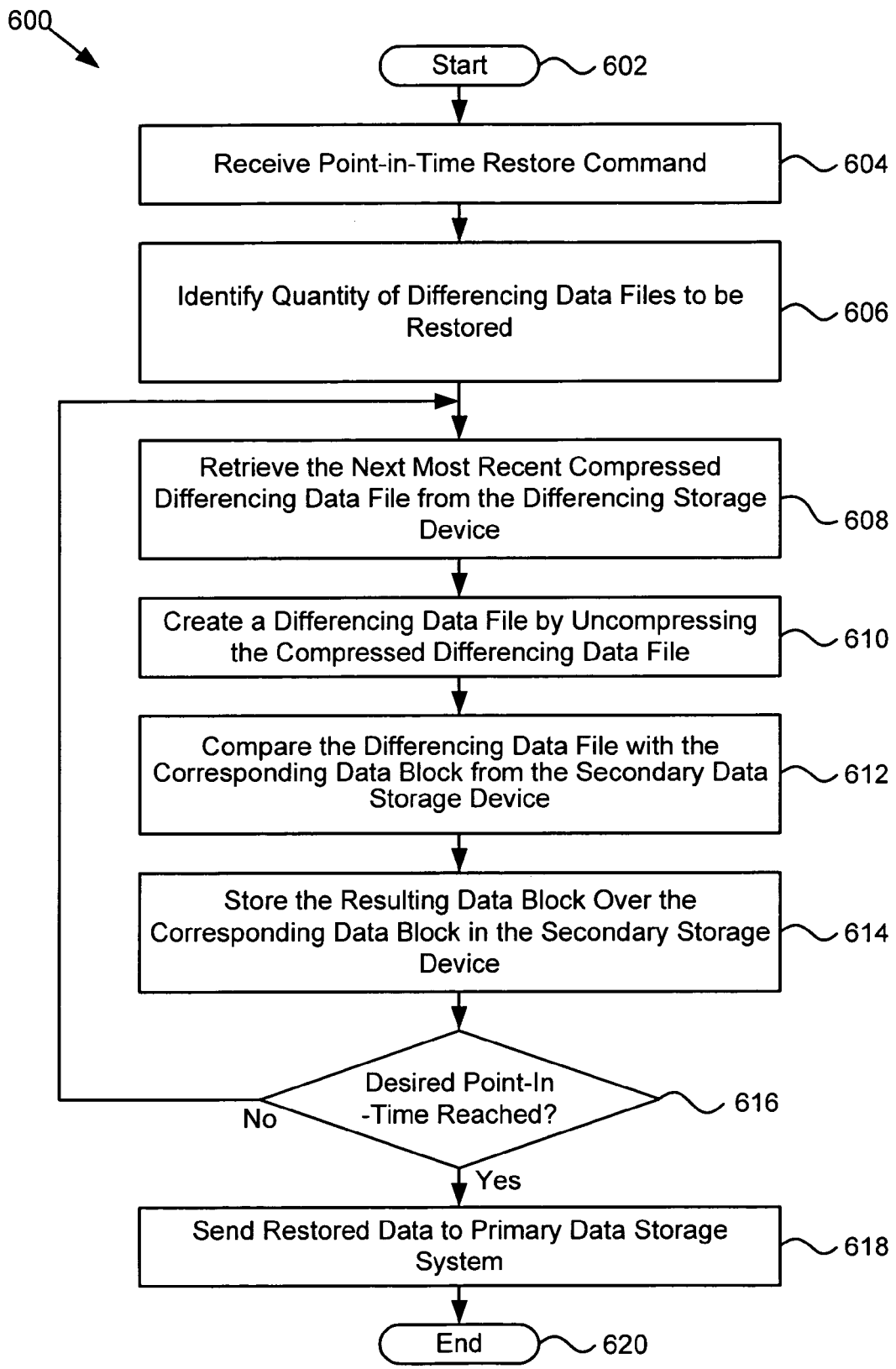
FIG. 6 is a schematic flow chart diagram illustrating one embodiment of a method to restore data in the secondary data storage device to a particular point in time in accordance with the present invention.

FIG. 6 is a flowchart diagram depicting one embodiment of the steps for restoring data on the secondary data storage device 222 corresponding to a particular point in time. The method 600 starts 602 when the data restore module 216 receives 604 a command to restore data in the secondary data storage device 222 to a particular point in time. The data restore module 216 then identifies 606 how many restore operations are required to reach the point in time desired.

The data restore module 216 then retrieves 608 the most recent compressed differencing data file from the differencing storage device 220. The data restore module 216 then creates 610 a differencing data file by uncompressing the compressed differencing data file. The data restore module 216 then compares 612 the differencing data file with the corresponding data block from the secondary data storage device 222 using the differencing function used to create the differencing data file. The resultant data block is identical to the data block from the secondary data storage device 222 just before the point in time when the differencing file was created. The data restore module 216 then stores the resultant data block over the corresponding data block in the secondary data storage device 222 to form a secondary data storage device 222 with data that is the same as the time just before the particular differencing file was created.

The data restore module 216 then determines 616 if the desired point-in-time has been reached. If not, the data restore module 216 returns and retrieves 608 the next most recent compressed differencing data file and the necessary steps are repeated to restore data in the secondary data storage device 222 corresponding to the next most recent time that a differencing data file was created. When the desired point-in-time is reached, the data restore module 216 sends the restored data to the primary data storage system 24 and the method 600 ends 620.

Figure 7:
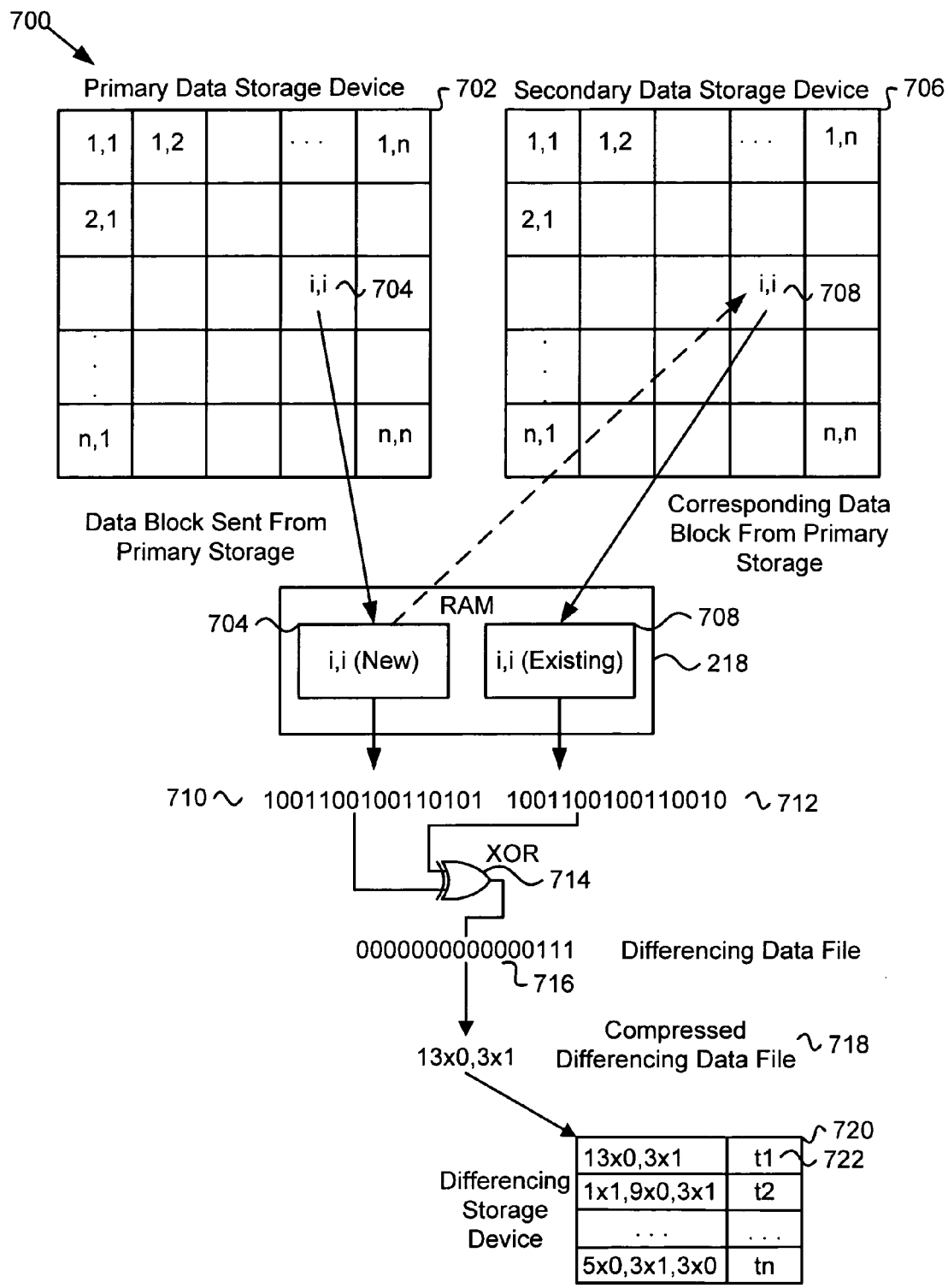
FIG. 7 is a conceptual diagram illustrating one embodiment of a method for efficient creation of point-in-time versions of data using differencing in accordance with the present invention.

FIG. 7 is a conceptual diagram 700 illustrating one embodiment of a method for efficient creation of point-in-time versions of data using differencing in accordance with the present invention. Remote replication systems create a mirror image of a data storage device at another location. A primary data storage system 24 includes a primary data storage device 306 that comprises a number of data blocks that are numbered in some way. In this diagram 700, the blocks of a the primary data storage device are represented by a matrix 702 with numbered rows and columns from 1,1 to n,n. When a particular data block is changed in the primary data storage system 24, herein represented by data block i,i 704, the data block is sent to the secondary data storage system 26. Within the secondary data storage system 26 is a secondary data storage device 222. Again, the organization of the secondary data storage device 222 is represented by a matrix 706 with numbered rows and columns from 1,1 to n,n. The data block i,i 704 in the primary data storage system 24 has a corresponding data block i,i 708 in the secondary data storage device 222.

Both the data block i,i 704 from the primary data storage device 306 and the data block i,i 708 from the secondary data storage device 222 are loaded into the RAM 218 of the secondary data storage system 26. Data block i,i 704 of the primary data storage device 306 is represented by a string of bits shown as 1001100100110101 710 and the data block i,i 708 from the secondary data storage device 222 is shown as 1001100100110010 712. If the two data blocks are compared using an XOR operation 714 the resultant differencing data file 716 is 0000000000000111. Since so much of the differencing data file 716 is unchanged between the two data blocks, the differencing data file is highly compressible.

The compressed differencing data file 718 is depicted as 13×0,3×1 or thirteen zeros followed by three ones. The compressed differencing data file 718 is stored in the differencing storage device 220, shown here as a matrix 720. The differencing storage device 220 includes the compressed differencing data file 718 along with the corresponding time period 722 when the data block 704 was sent from the primary data storage system 24 as well as other compressed differencing data files from other previous time periods. The final step, depicted here with a dashed arrow, is to overwrite the data block i,i 708 from the secondary data storage device 26 with the data block i,i 704 from the primary data storage device 306.

Figure 8:
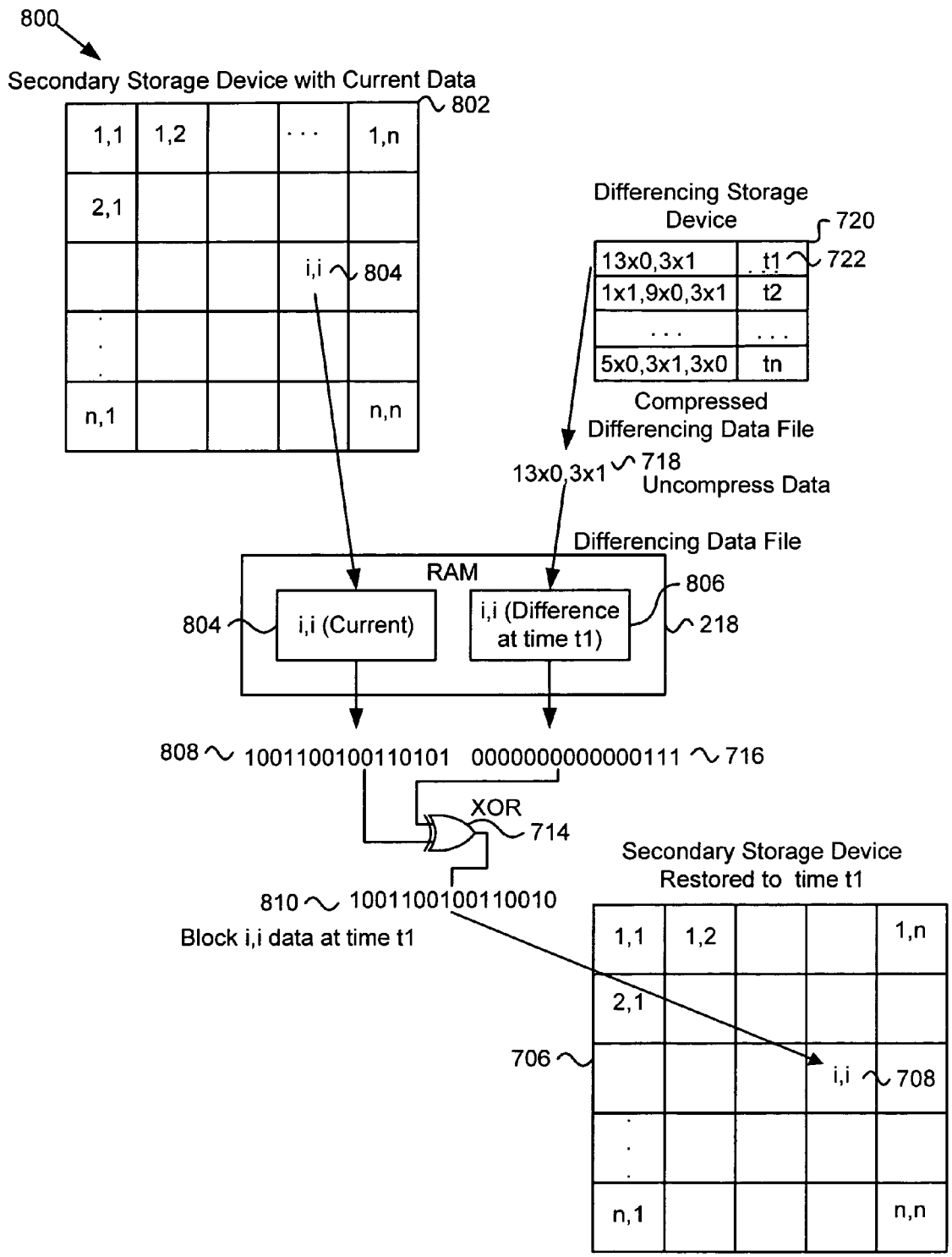
FIG. 8 is a conceptual diagram illustrating one embodiment of a method to restore data in a secondary data storage device to a particular point in time in accordance with the present invention.

FIG. 8 is a conceptual diagram 800 illustrating one embodiment of a method to restore data in the secondary data storage device to a particular point in time (t1) 722 in accordance with the present invention. A matrix 802 representing the secondary data storage device 222 with current data is shown. Once a command is received to restore the data on the secondary data storage device 222 to a particular point in time, the first step is to restore the data to the most recent time period t1 722 when a differencing operation was undertaken. In this case the differencing operation involved data block i,i 804 which is loaded into the RAM 218. The latest compressed differencing data file 718 in the differencing storage device 220, shown here as a matrix 720, is uncompressed.

The resulting differencing data file 806 is then loaded into the RAM 218. The data block i,i 804 is represented here as a string of bits shown here as 1001100100110101 808 and the differencing data file is likewise represented here as 0000000000000111 716. The data block i,i 804 and the differencing data file 806 are compared here using an XOR operation 714. The resultant data 1001100100110010 810 is identical to the data 712 from the secondary data storage device 222 used to create the differencing data file 716.

The resultant data block i,i 708 is used to overwrite the data block in the secondary data storage device 222 at the same position where the data block i,i 804 came from in the first step of the restore operation. The data in the secondary data storage device 222 then matches time t1 722 when the differencing data file was created and is shown again here as a matrix 706. The process is then repeated for successive compressed differencing data files in the differencing storage device 220 until the data in the secondary data storage device 222 is returned to the desired point in time.

The schematic flow chart diagrams used herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficient creation of point-in-time versions of data using differencing in a read-before-write environment, the apparatus comprising:
    a receive module of a secondary data storage system, the receive module being configured to receive a data block sent from a primary data storage system via a communication path;
    a read module of the secondary data storage system, the read module being configured to read a data block from a secondary data storage device of the secondary data storage system into a random access memory of the secondary data storage system, the data block corresponding to the data block sent from the primary data storage system and the secondary storage device comprising a backup copy of data on a primary data storage device in the primary storage system, the primary data storage device comprising a copy of the received data block;
    a comparison module of the secondary data storage system, the comparison module configured to compare the data block sent from the primary data storage system with the data block from the secondary data storage device and to create a differencing data file comprising data to restore the received data block to a previous state corresponding to the data block from the secondary storage device;
    a compression module of the secondary data storage system, the compression module configured to compress the differencing data file and to create a compressed differencing data file;
    a differencing storage module of the secondary data storage system, the differencing storage module being configured to store the compressed differencing data file in a differencing storage device; and
    a block storage module of the secondary data storage system, the block storage module being configured to store the data block sent from the primary data storage system in the location of the data block from the secondary data storage device and to delete from the random access memory the data block from the secondary data storage device in response to one of creating the differencing data file and storing the compressed differencing data file.

2. The apparatus of claim 1, wherein the comparison module is further configured to compare the data block sent from the primary data storage system with the corresponding data block from the secondary data storage device using an exclusive OR operation.

3. The apparatus of claim 1, wherein the compressed differencing data file resides on the differencing storage device together with other compressed differencing files from previous differencing operations, each compressed differencing file stored with data representing point-in-time information.

4. The apparatus of claim 1, further comprising a data restore module configured to restore data in the secondary data storage device to a particular point in time by:
    retrieving a most recent compressed differencing data file from the differencing storage device;
    creating a differencing data file by uncompressing the compressed differencing data file;
    comparing the uncompressed differencing data file with the corresponding data block from the secondary data storage device to create a resulting data block that matches the point in time associated with the compressed differencing data file;
    storing the resulting data block over the data block from the secondary data storage device; and
    repeating the above steps for successive compressed differencing data files until the point in time is reached for which the restore was sought.

5. The Apparatus of claim 4, further comprising sending the restored data from the secondary storage device to the primary storage system in response to reaching the point in time for which the restore was sought.

6. The apparatus of claim 1, wherein the receive module, the read module, the comparison module, the compression module, and the differencing storage module are located in a secondary data storage system.

7. The apparatus of claim 1, wherein the receive module, the read module, the comparison module, the compression module, and the differencing storage module are located in the primary data storage system.

8. The apparatus of claim 1, wherein the receive module is further configured to receive a color comprising one or more data blocks sent together from the primary data storage system, and wherein the read module, the comparison module, the compression module, and the differencing module process each data block in the color separately.

9. A system for efficient creation of point-in-time versions of data using differencing in a read-before-write environment, the system comprising:
    a primary data storage system configured to send a data block to a secondary data storage system, the secondary storage system comprising a secondary storage device with a backup copy of data on a primary storage device of the primary storage system;
    a controller in the secondary data storage system, the controller comprising:
        a receive module configured to receive a data block sent from the primary data storage system, a copy of the data block stored on the primary storage device;
        a read module configured to read a data block from the secondary data storage device into a random access memory, the data block corresponding to the data block sent from the primary data storage system;
        a comparison module configured to compare the data block sent from the primary data storage system with the data block from the secondary data storage device and to create a differencing data file comprising data to restore the received data block to a previous state corresponding to the data block from the secondary storage device;
        a compression module configured to compress the differencing data file and to create a compressed differencing data file;
        a differencing storage module configured to store the compressed differencing data file in a differencing storage device, the differencing storage device located in the secondary data storage system; and
        a block storage module configured to store the data block sent from the primary data storage system in the location of the data block from the secondary data storage device and to delete from the random access memory the data block from the secondary data storage device in response to one of creating the differencing data file and storing the compressed differencing data file; and a wide area network configured to connect the primary data storage system with the secondary data storage system.

10. The system of claim 9, wherein the comparison module is further configured to compare the data block sent from the primary data storage system with the corresponding data block from the secondary data storage device using a bit-level exclusive OR operation.

11. The system of claim 9, wherein the compressed differencing data file resides on the differencing storage device together with other compressed differencing files from previous differencing operations, each compressed differencing file stored with data representing point-in-time information.

12. The system of claim 9, wherein the receive module is further configured to receive a color comprising one or more data blocks sent together from the primary data storage system wherein the read module, the comparison module, the compression module, and the differencing module process each data block in the color separately.

13. The system of claim 9, further comprising a data restore module located in the controller of the secondary data storage system configured to restore data in the secondary data storage device to a particular point in time by:
    retrieving a most recent compressed differencing data file from the differencing storage device;
    creating a differencing data file by uncompressing the compressed differencing data file;
    comparing the uncompressed differencing data file with the corresponding data block from the secondary data storage device to create a resulting data block that matches the point in time associated with the compressed differencing data file;
    storing the resulting data block over the data block from the secondary data storage device; and
    repeating the above steps for successive compressed differencing data files until the point in time is reached for which the restore was sought.

14. A computer readable storage medium comprising computer readable code configured to carry out a method for efficient creation of point-in-time versions of data using differencing in a read-before-write environment, the method comprising:
    receiving a data block sent from a primary data storage system;
    reading a data block from a secondary data storage device into a random access memory, the data block corresponding to the data block sent from the primary data storage system and the secondary storage device comprising a backup copy of data on a primary data storage device in the primary storage system, the primary data storage device comprising a copy of the received data block;
    comparing the data block sent from the primary data storage system with the data block from the secondary data storage device and to create a differencing data file comprising data to restore the received data block to a previous state corresponding to the data block from the secondary storage device;
    compressing the differencing data file and creating a compressed differencing data file;
    storing the compressed differencing data file in a differencing storage device; and
    storing the data block sent from the primary data storage system in the location of the data block from the secondary data storage device and deleting from the random access memory the data block from the secondary data storage device in response to one of creating the differencing data file and storing the compressed differencing data file.

15. The computer readable storage medium of claim 14, wherein comparing the data block sent from the primary data storage system with the corresponding data block from the secondary data storage device further comprises conducting an exclusive OR operation.

16. The computer readable storage medium of claim 14, wherein the compressed differencing data file resides on the differencing storage device together with other compressed differencing files from previous differencing operations.

17. The computer readable storage medium of claim 14, wherein restoring data in the secondary data storage device to a particular point in time comprises:
    retrieving a most recent compressed differencing data file from the differencing storage device;
    creating a differencing data file by uncompressing the compressed differencing data file;
    comparing the uncompressed differencing data file with the corresponding data block from the secondary data storage device to create a resulting data block that matches the point in time associated with the compressed differencing data file;
    storing the resulting data block over the data block from the secondary data storage device; and
    repeating the above steps for successive compressed differencing data files until the point in time is reached for which the restore was sought.

18. The computer readable storage medium of claim 14, wherein the method further comprises receiving a color comprising one or more data blocks sent together from the primary data storage system and each data block in the color is processed separately.

19. A method for efficient creation of point-in-time versions of data using differencing in a read-before-write environment, the method comprising:
    receiving a data block sent from a primary data storage system;
    reading a data block from a secondary data storage device into a random access memory, the data block corresponding to the data block sent from the primary data storage system and the secondary storage device comprising a backup copy of data on a primary data storage device in the primary storage system, the primary data storage device comprising a copy of the received data block;
    comparing the data block sent from the primary data storage system to the data block from the secondary data storage device and creating a differencing data file;
    compressing the differencing data file and creating a compressed differencing data file comprising data to restore the received data block to a previous state corresponding to the data block from the secondary storage device;
    storing the compressed differencing data file in a differencing storage device; and
    storing the data block sent from the primary data storage system in the location of the data block from the secondary data storage device and deleting from the random access memory the data block from the secondary data storage device in response to creating a differencing data file.

20. The method of claim 19, wherein comparing the data block sent from the primary data storage system with the corresponding data block from the secondary data storage device further comprises conducting an exclusive OR operation.

21. The method of claim 19, wherein the compressed differencing data file resides on the differencing storage device together with other compressed differencing files from previous differencing operations.

22. An apparatus for efficient creation of point-in-time versions of data using differencing in a read-before-write environment, the apparatus comprising:

means for receiving a data block sent from a primary data storage system;

means for reading a data block from a secondary data storage device into a random access memory, the data block corresponding to the data block sent from the primary data storage system and the secondary storage device comprising a backup copy of data on a primary data storage device in the primary storage system, the primary data storage device comprising a copy of the received data block;

means for comparing the data block sent from the primary data storage system with the data block from the secondary data storage device and creating a differencing data file;

means for compressing the differencing data file and creating a compressed differencing data file comprising data to restore the received data block to a previous state corresponding to the data block from the secondary storage device;

means for storing the compressed differencing data file in a differencing storage device; and means for storing the data block sent from the primary data storage system in the location of the data block from the secondary data storage device and deleting from the random access memory the data block from the secondary data storage device in response to storing the differencing data file.

* * * * *

UNITED STATES PATENT AND TRADEMARK OFFICE
CERTIFICATE OF CORRECTION

PATENT NO. : 7,580,959 B2  Page 1 of 1
APPLICATION NO. : 10/867058
DATED : August 25, 2009
INVENTOR(S) : Boyd et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Fourteenth Day of September, 2010

David J. Kappos
*Director of the United States Patent and Trademark Office*